Nov. 7, 1967   M. A. SEQUEIRA   3,351,068
AUTOMOBILE ASHTRAY PIPE CLEANER
Filed Jan. 13, 1966   2 Sheets-Sheet 1

Manuel A. Sequeira
INVENTOR.

BY *Clarence A. O'Brien*
and *Harvey B. Jackson*
Attorneys

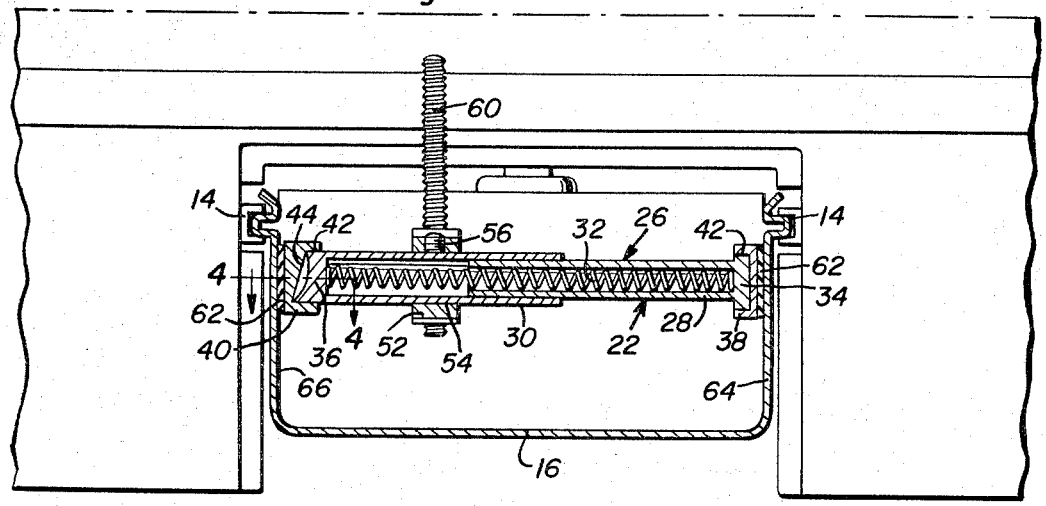
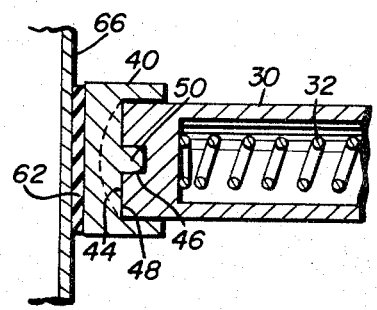
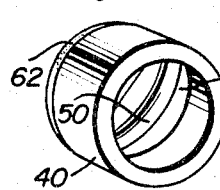
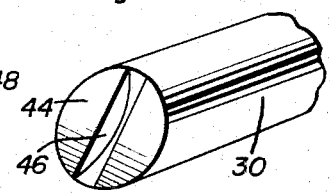
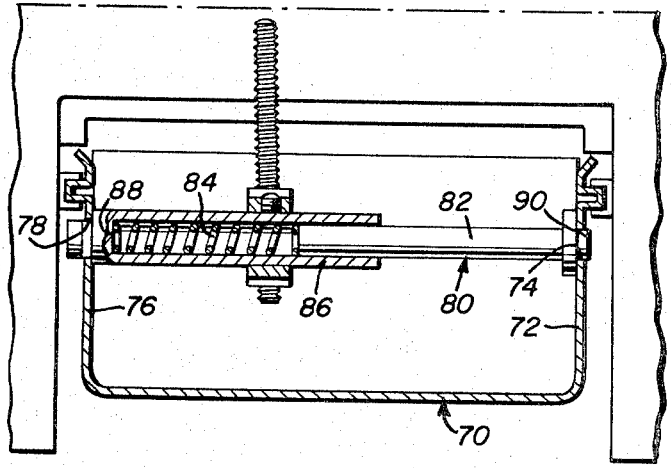
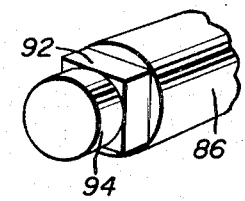
Manuel A. Sequeira
INVENTOR.

United States Patent Office 3,351,068
Patented Nov. 7, 1967

3,351,068
AUTOMOBILE ASHTRAY PIPE CLEANER
Manuel A. Sequeira, 1072 Welch Ave.,
San Jose, Calif. 95117
Filed Jan. 13, 1966, Ser. No. 520,522
13 Claims. (Cl. 131—232)

This invention relates to a novel and useful automobile ashtray pipe cleaner and more specifically to an assembly which is adapted to clean the bowl of a pipe and which may be provided either in the form of an attachment for existing ashtrays or as a component of new ashtrays being manufactured.

There have heretofore been several types of pipe cleaners constructed for use in a motor vehicle by the driver of the vehicle such as the pipe cleaner and holder disclosed in U.S. Patent No. 2,725,884, dated December 6, 1955. However, these previous pipe bowl cleaners have been constructed as separate units and not as a component of an existing automobile ashtray and accordingly, such previous pipe bowl cleaners have had to be individually mounted in the associated motor vehicle independently of a conventional ashtray of that motor vehicle. Further, inasmuch as pipe cleaners may be most advantageously used in a vehicle by the driver of the latter if they are constructed in a manner defining an upstanding shank portion supported from the approximate center of an upwardly opening receptacle above which the upper end of the shank portion projects whereby the driver of the vehicle may readily clean the bowl of his pipe by engaging the upper end of such a shank portion in the inverted bowl portion of his pipe while holding the pipe in one hand thereby leaving his other hand free to control the vehicle, a problem arises in providing a pipe cleaner as a component of a conventional retractable vehicle ashtray since such a conventional ashtray could not be readily retracted if it supported an upstanding shank-type cleaner whose upper end projects above the upper edges of the retractable ashtray.

It is accordingly the main object of this invention to provide an automobile ashtray pipe cleaner constructed in a manner whereby the shank-type pipe bowl cleaning portion thereof is supported from an automobile ashtray for movement between an upstanding operative position with its upper end projecting above the upper extremities of the ashtray and a retracted position disposed entirely within the confines of the ashtray.

Another object of this invention is to provide an automobile ashtray pipe cleaner in accordance with the immediately preceding object and including structural components which will adapt the pipe cleaner to be constructed as an attachment for existing automobile ashtrays as well as a component of automobile ashtrays being presently manufactured.

Yet another object of this invention is to provide an automobile ashtray pipe cleaner in accordance with the preceding objects which may be readily shifted between the operative and inoperative positions thereof.

A final object of this invention to be specifically enumerated herein is to provide an automobile ashtray pipe cleaner which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a fragmentary sectional view taken substantially upon the plane indicated by the section line 3—3 of FIGURE 2;

FIGURE 4 is a fragmentary enlarged sectional view taken substantially upon the plane indicated by the section line 4—4 of FIGURE 3;

FIGURE 5 is a perspective view of one of the journal block defining members of the pipe cleaner;

FIGURE 6 is a fragmentary perspective view of one end portion of the support arm or mounting shaft portion of the pipe cleaner which is adapted to be journaled by the journal block of FIGURE 5;

FIGURE 7 is a fragmentary sectional view similar to that of FIGURE 3 but illustrating a modified form of pipe cleaner comprising a component of a modified form of ashtray;

FIGURE 8 is a fragmentary perspective view similar to that of FIGURE 6 but of one end portion of the support arm or shaft portion of the pipe cleaner illustrated in FIGURE 7.

Figure 1:
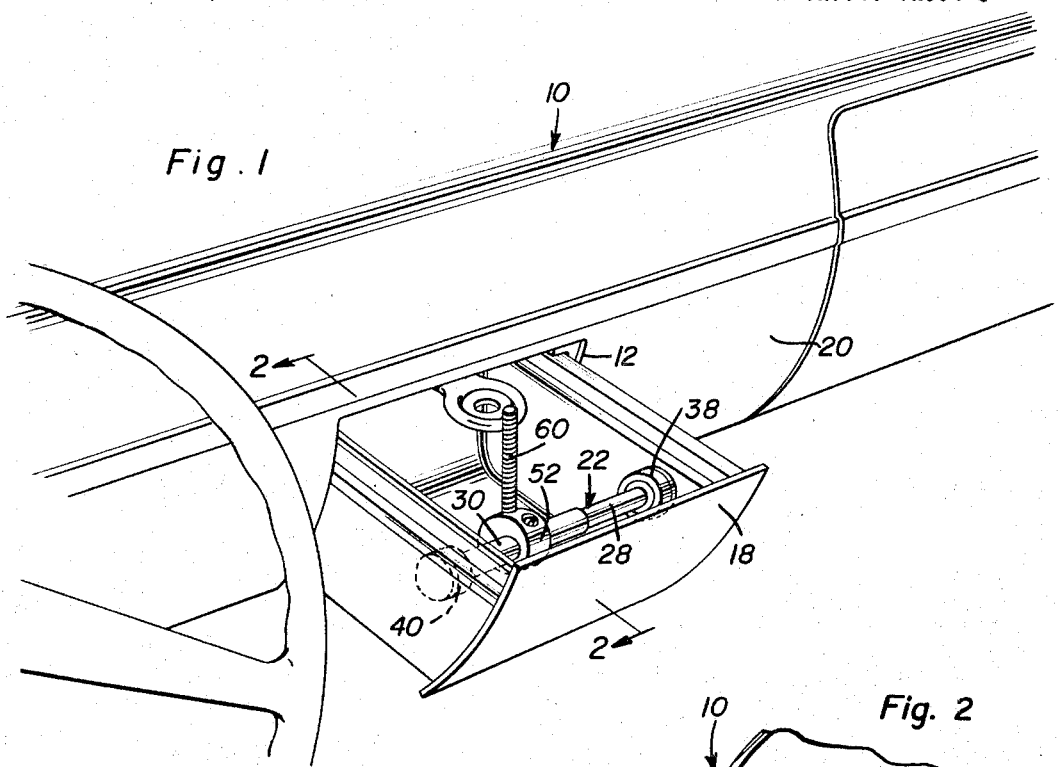
FIGURE 1 is a fragmentary perspective view of the dashboard of a conventional motor vehicle illustrating the horizontally slidable and retractable conventional ashtray supported therefrom and with the pipe cleaner of the instant invention operatively mounted on the ashtray as an attachment therefor.

Referring now more specifically to the drawings, the numeral 10 generally designates the dashboard of a conventional motor vehicle in which an ashtray opening 12 is formed. The dashboard 10 includes a pair of guides 14 disposed within the opening and from which an upwardly opening bowl-type ashtray 16 is slidingly supported for movement between an extended position projecting outwardly of the opening 12 and a retracted position with the front wall 18 of the ashtray flush with the front face 20 of the dashboard 10.

The pipe cleaner of the instant invention is generally referred to by the reference numeral 22 and includes an elongated support arm generally referred to by the reference numeral 26.

The support arm 26 includes a pair of opposite end sections 28 and 30 and it may be seen from FIGURE 3 of the drawings that each of the sections 28 and 30 is of tubular construction and that the sections are longitudinally aligned with one end portion of the section 28 telescopically received within the adjacent end portion of the section 30. In addition, an expansion spring 32 is disposed within the sections 28 and 30 and between the remote end walls 34 and 36 thereof.

A pair of journal blocks 38 and 40 are provided and the journal block 38 includes a blind bore 42 in which the end of the section 28 remote from the section 30 is rotatably journaled. In addition, the end of the section 30 remote from the section 28 is rotatably journaled in the blind bore 42 defined by the journal block 40. However, the free end face of the section 30 is beveled as at 44 and has a diametric groove 46 formed therein. The closed end 48 of the bore 42 is inclined to match the angle of the bevel 44 and is provided with a diametric rib 50 which is seatingly receivable in the groove 46.

Further, the section 30 has a generally annular mounting member 52 mounted thereon. The mounting member 52 includes an eccentric bore 54 through which the section 30 is snugly and rotatably received and the mounting member is provided with a set-screw 56 for adjustably securing the mounting member 52 on the section 30 in adjusted rotated positions relative to the latter as well as adjusted positions longitudinally of the latter. Still further, the mounting member 52 includes a threaded bore 58 extending therethrough through which a pipe bowl cleaning shank 60 is threadedly engaged.

The journal blocks 38 and 40 include adhesive means 62 on their remote surfaces adhesively securing the journal blocks 38 and 40 to the inner surfaces of the upstanding sides 64 and 66 of the ashtray 16.

Figure 2:
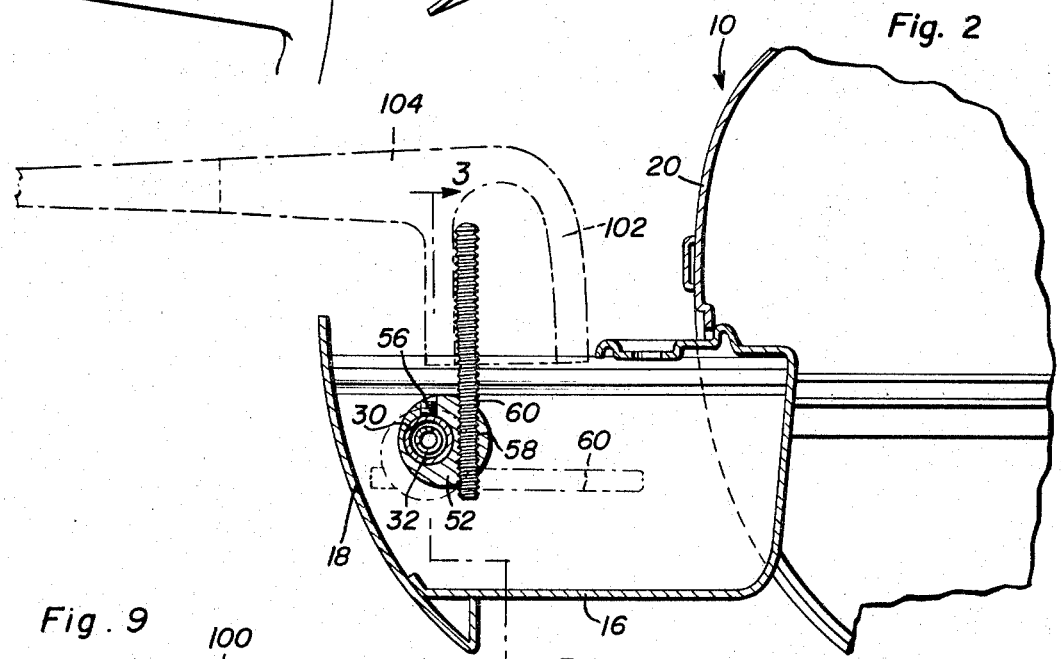
FIGURE 2 is an enlarged fragmentary sectional view taken substantially upon the plane indicated by the section line 2—2 of FIGURE 1.

From FIGURE 2 of the drawings it may be seen that the shank 60 may be swung from the solid line position to the retracted phantom line position by swinging the upper end of the shank 60 toward the dashboard 20 when the ashtray 18 is in its extended position. The beveled faces of the support arm or shaft 26 and the journal block 40 coact with the expansion spring 32 to yieldingly retain the shank 60 in the solid line position illustrated in FIGURE 2 of the drawings. In this position the projection 50 is seated in the groove 46 and it is therefore necessary, in order to pivot the shank 60 to the phantom line position illustrated in FIGURE 2 of the drawings, to axially displace the section 30 to the right as viewed in FIGURE 3 of the drawings against the thrust of the expansion spring 32 so as to unseat the projection 50 from the groove 46 before swinging the shank 60 toward the dashboard 10. However, once the shank 60 has been swung to the phantom line position illustrated in FIGURE 2 of the drawings, the ashtray 18 may be readily slid to its fully retracted position with the front wall 18 flush with the front surface 20 of the dashboard 10.

With attention now invited to FIGURE 7 of the drawings there may be seen a modified form of ashtray generally referred to by the reference numeral 70 and which is substantially identical to the ashtray 16 with the exception that the side 72 of the ashtray 70 is provided with a circular opening 74 and the side 76 is provided with a square opening 78. The openings 74 and 78 are aligned and the pipe cleaning attachment to be utilized in conjunction with the ashtray 70 is generally referred to by the reference numeral 80. The attachment 80 comprises a substantial duplicate of the attachment 22 except that the section 82 thereof is of solid construction and the compression spring 84 thereof is disposed between the end of the section 82 telescoped within the section 86 and the closed end wall 88 of the section 86. In addition, the end of the section 86 remote from the section 82 is provided with a cylindrical end portion 90 rotatably received in the opening 74 and the end of the section 86 is provided with a square end portion 92 snugly received within the square opening 78 but also a terminal end portion 94 which is cylindrical in configuration and which is rotatable in the square opening 78. Accordingly, when the section 86 is positioned as illustrated in FIGURE 7 of the drawings, it is locked against rotation relative to the side 76. However, when the section 86 is manually displaced by the user to the right against the force of the compression spring 84 sufficient to withdraw the end portion 92 from the opening 78, the section 86 is rotatable about its longitudinal axis with its end remote from the section 82 being supported by the journaling effect of the square opening 78 on the cylindrical terminal end portion 94 of the section 86.

Figure 9:
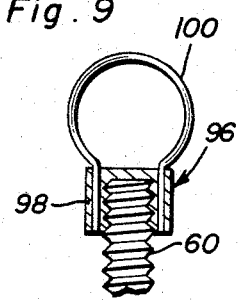
FIGURE 9 is a fragmentary sectional view illustrating the manner in which a loop-defining attachment may be removably secured to the upper end portion of the shank of the pipe cleaner.

With attention now directed to FIGURE 9 of the drawings there may be seen an accessory generally referred to by the reference numeral 96 and including a threaded cap portion 98 from which a loop 100 is supported. The threaded cap portion 98 is removably threadedly engaged with the shank 60 and may be utilized in lieu of the upper end of the shank 60 in order to clean the interior of the bowl portion 102 of the pipe 104.

It is of course to be noted that the shank 60 may be longitudinally adjusted relative to the mounting member 52 and that the pipe cleaner 22 illustrated in FIGURES 1–6 may be adjusted slightly in position within the ashtray 18 merely by repositioning the journal blocks 38 and 40 on the inner surfaces of the sides 64 and 66 of the ashtray 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, an ashtray including upstanding opposite sides, an elongated pipe bowl cleaning shank, means pivotally supporting one end portion of said shank in said tray for rotation about an axis extending between said sides and transversely of said shank and movement of said shank between an operative upright position with the other end portion of said shank projecting above said sides and an inoperative generally horizontal position with said shank disposed below the uppermost extremities of said tray, said means pivotally supporting said shank in said tray including means operative to releasably retain said shank in said operative position and said first-mentioned means also including means operative to axially adjust said shank relative to said axis.

2. In combination, an ashtray including upstanding opposite sides, an elongated pipe bowl cleaning shank, means pivotally supporting one end portion of said shank in said tray for rotation about an axis extending between said sides and transversely of said shank and movement of said shank between an operative upright position with the other end portion of said shank projecting above said sides and an inoperative generally horizontal position with said shank disposed below the uppermost extremities of said tray, said means pivotally supporting said shank in said tray including means operative to releasably retain said shank in said operative position, the first-mentioned means also including means mounting said shank for limited lateral shifting along said axis and means yieldingly urging said shank toward one limit position of lateral displacement, said means operative to releasably retain said shank in said operative position being rendered inoperative upon lateral displacement of said shank along said axis away from said one limit position.

3. In combination, an ashtray including upstanding opposite sides, an elongated pipe bowl cleaning shank, means pivotally supporting one end portion of said shank in said tray for rotation about an axis extending between said sides and transversely of said shank and movement of said shank between an operative upright position with the other end portion of said shank projecting above said sides and an inoperative generally horizontal position with said shank disposed below the uppermost extremities of said tray, said means pivotally supporting said shank in said tray including means operative to releasably retain said shank in said operative position, said means pivotally supporting said shank in said tray comprising an elongated support arm extending between and journalled from said sides, said support arm including a portion thereon having a threaded bore formed therethrough extending transversely of said arm in which said shank is threadedly engaged.

4. In combination, an ashtray including upstanding opposite sides, an elongated pipe bowl cleaning shank, means pivotally supporting one end portion of said shank in said tray for rotation about an axis extending between said sides and transversely of said shank and movement of said shank between an operative upright position with the other end portion of said shank projecting above said sides and an inoperative generally horizontal position with said shank disposed below the uppermost extremities of said tray, said means pivotally supporting said shank in said tray including means operative to releasably retain said shank in said operative position, said means pivotally supporting said shank in said tray comprising an elongated support arm extendng between and journaled from said sides, said support arm including a pair of axially aligned sections having adjacent end portions slidingly and guidingly engaged with each other for relative axial shifting of said sections, said shank being carried by one of said sections.

5. The combination of claim 4 wherein one of said sections includes a portion thereon having a threaded bore formed therethrough extending transversely of said one section in which said shank is threadedly engaged.

6. In combination, an ashtray including upstanding opposite sides, an elongated pipe bowl cleaning shank, means pivotally supporting one end portion of said shank in said tray for rotation about an axis extending between said sides and transversely of said shank and movement of said shank between an operative upright position with the other end portion of said shank projecting above said sides and an inoperative generally horizontal position with said shank disposed below the uppermost extremities of said tray, said means pivotally supporting said shank in said tray including means operative to releasably retain said shank in said operative position, said means pivotally supporting said shank in said tray comprising an elongated support arm extending between and journaled from said sides, said sides including means defining aligned journal bores opening toward each other, the opposite ends of said support arm being journaled in said bores.

7. The combination of claim 6 wherein said bores are formed in journal blocks secured to the inner surfaces of said sides.

8. The combination of claim 7 wherein said blocks are adhesively secured to said sides.

9. In combination, an ashtray including upstanding opposite sides, an elongated pipe bowl cleaning shank, means pivotally supporting one end portion of said shank in said tray for rotation about an axis extending between said sides and transversely of said shank and movement of said shank between an operative upright position with the other end portion of said shank projecting above said sides and an inoperative generally horizontal position with said shank disposed below the uppermost extremities of said tray, said means pivotally supporting said shank in said tray including means operative to releasably retain said shank in said operative position, said means pivotally supporting said shank in said tray comprising an elongated support arm extendng between and journaled from said sides, said sides including means defining aligned journal bores opening toward each other, the opposite ends of said support arm being journaled in said bores, said bores being formed in journal blocks secured to the inner surfaces of said sides, at least one of said bores being blind and including an end wall at its inner end, said end wall and the corresponding end of said support arm including axially removably engaged coacting projection and recess means comprising said means operative to releasably retain said shank in said operative position.

10. In combination, an ashtray including upstanding opposite sides, an elongated pipe bowl cleaning shank, means pivotally supporting one end portion of said shank in said tray for rotation about an axis extending between said sides and transversely of said shank and movement of said shank between an operative upright position with the other end portion of said shank projecting above said sides and an inoperative generally horizontal position with said shank disposed below the uppermost extremities of said tray, said means pivotally supporting said shank in said tray including means operative to releasably retain said shank in operative position, said means pivotally supporting said shank in said tray comprising an elongated support arm extending between and journaled from said sides, said sides including means defining aligned journal bores opening toward each other, the opposite ends of said support arm being journaled in said bores, said bores being formed through said sides, one of said bores being symmetrical about its center and noncircular, the corresponding end of said support arm including a diametrically reduced noncircular end portion complementary in cross-sectional shape to said noncircular bore and axially receivable therein, said end portion terminating in a terminal end portion generally cylindrical in cross-section and rotatable in said noncircular bore.

11. In combination, an ashtray including upstanding opposite sides, an elongated pipe bowl cleaning shank, means pivotally supporting one end portion of said shank in said tray for rotation about an axis extending between said sides and transversely of said shank and movement of said shank between an operative upright position with the other end portion of said shank projecting above said sides and an inoperative generally horizontal position with said shank disposed below the uppermost extremities of said tray, said means pivotally supporting said shank in said tray including means operative to releasably retain said shank in said operative position, said means pivotally supporting said shank in said tray comprising an elongated support arm extending between and journaled from said sides, said support arm including a pair of axially aligned sections having adjacent end portions slidingly and guidingly engaged with each other for relative axial shifting of said sections, said shank being carried by one of said sections, said adjacent end portions being telescopingly engaged with each other, and spring means yieldingly urging said sections toward extended positions relative to each other.

12. The combination of claim 3 including a wire shaped loop secured to the other end portion of said shank disposed in a plane generally paralleling said shank.

13. In combination, an ashtray including upstanding opposite sides, an elongated pipe bowl cleaning shank, means pivotally supporting one end portion of said shank in said tray for rotation about an axis extending between said sides and transversely of said shank and movement of said shank between an operative upright position with the other end portion of said shank projecting above said sides and an inoperative generally horizontal position with said shank disposed below the uppermost extremities of said tray, said means pivotally supporting said shank in said tray including means operative to releasably retain said shank in said operative position, said means pivotally supporting said shank in said tray comprising an elongated support arm extending between and journaled from said sides, said support arm including a portion thereon having a threaded bore formed therethrough extending transversely of said arm in which said shank is threadedly engaged, said portion being mounted on said support arm for adjustable positioning there along.

References Cited

UNITED STATES PATENTS

| 867,885 | 10/1907 | Kanaly | 131—246 |
| 2,086,738 | 7/1937 | Possinger | 131—246 |
| 2,103,754 | 12/1937 | Pearce | 131—232 |
| 2,171,314 | 8/1939 | Ray | 131—232 |
| 2,633,853 | 4/1953 | Smereck | |
| 2,725,884 | 12/1955 | Colby | 131—232 |

FOREIGN PATENTS 435,745    9/1935    Great Britain.

SAMUEL KOREN, Primary Examiner.

JOSEPH S. REICH, Examiner.